(12) United States Patent
Stayton

(10) Patent No.: US 9,134,416 B2
(45) Date of Patent: Sep. 15, 2015

(54) SYSTEMS AND METHODS OF PROVIDING A TCAS PRIMARY RADAR

(75) Inventor: Gregory T. Stayton, Peoria, AZ (US)

(73) Assignee: Aviation Communication & Surveillance Systems LLC, Phoenix, AZ (US)

(*) Notice: Subject to any disclaimer, the term of this patent is extended or adjusted under 35 U.S.C. 154(b) by 471 days.

(21) Appl. No.: 12/965,738

(22) Filed: Dec. 10, 2010

(65) Prior Publication Data

US 2012/0068877 A1    Mar. 22, 2012

Related U.S. Application Data

(60) Provisional application No. 61/285,489, filed on Dec. 10, 2009.

(51) Int. Cl.
*G01S 13/93* (2006.01)
*G01S 3/02* (2006.01)

(52) U.S. Cl.
CPC ............. *G01S 13/9303* (2013.01); *G01S 3/023* (2013.01)

(58) Field of Classification Search
CPC .... G01S 13/9303; G01S 13/781; G01S 7/006
USPC ................................................. 342/29, 30, 36
See application file for complete search history.

(56) References Cited

U.S. PATENT DOCUMENTS

| | | | |
|---|---|---|---|
| 6,278,396 B1* | 8/2001 | Tran | 342/29 |
| 7,961,135 B2* | 6/2011 | Smith et al. | 342/29 |
| 2007/0152814 A1* | 7/2007 | Stefani | 340/539.22 |
| 2008/0150784 A1* | 6/2008 | Zhang et al. | 342/30 |
| 2010/0039310 A1* | 2/2010 | Smith et al. | 342/29 |

* cited by examiner

*Primary Examiner* — Timothy A Brainard
(74) *Attorney, Agent, or Firm* — Allen J. Moss; Squire Patton Boggs (US) LLP

(57) ABSTRACT

Systems and related methods are delineated for employing a TCAS to provide a radar function for a UAS. One such system comprises a TCAS having at least a transceiver and an antenna, and a processor coupled to the transceiver for receiving signals generated from receipt of reflected energy received over the antenna, the reflected energy resulting from the one or more of a Mode S interrogation waveform and an ATCRBS interrogation waveform transmitted from the antenna.

3 Claims, 6 Drawing Sheets

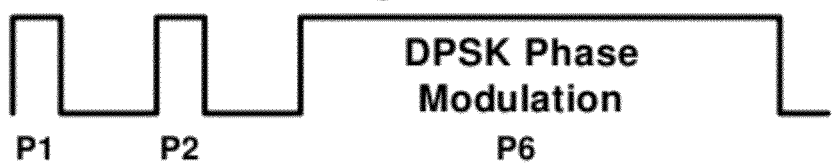
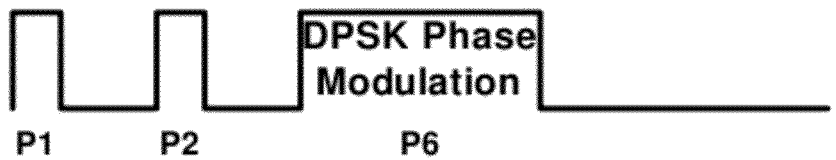
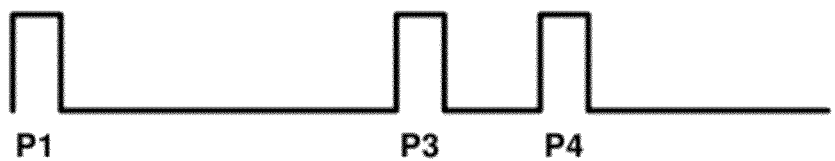
Figure 1, Primary Radar TCAS Emissions

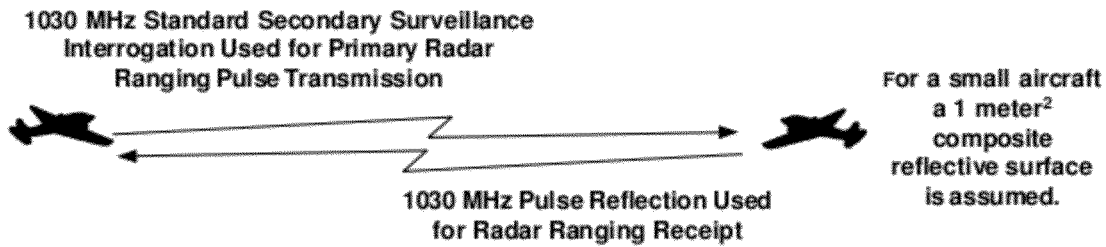
Figure 2, TCAS Primary Radar Basic Concept

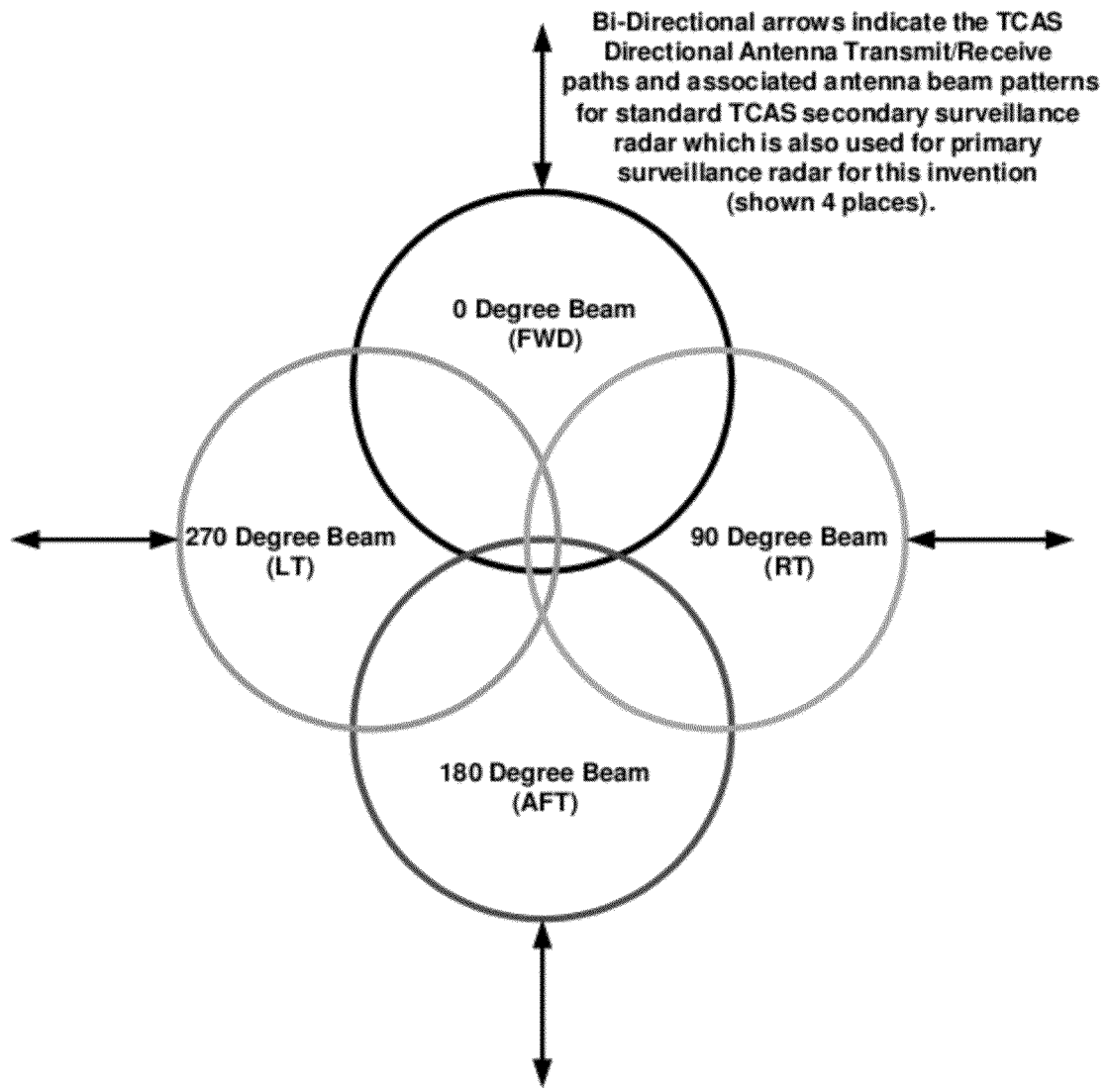
Figure 3, TCAS Antenna Beam Emissions

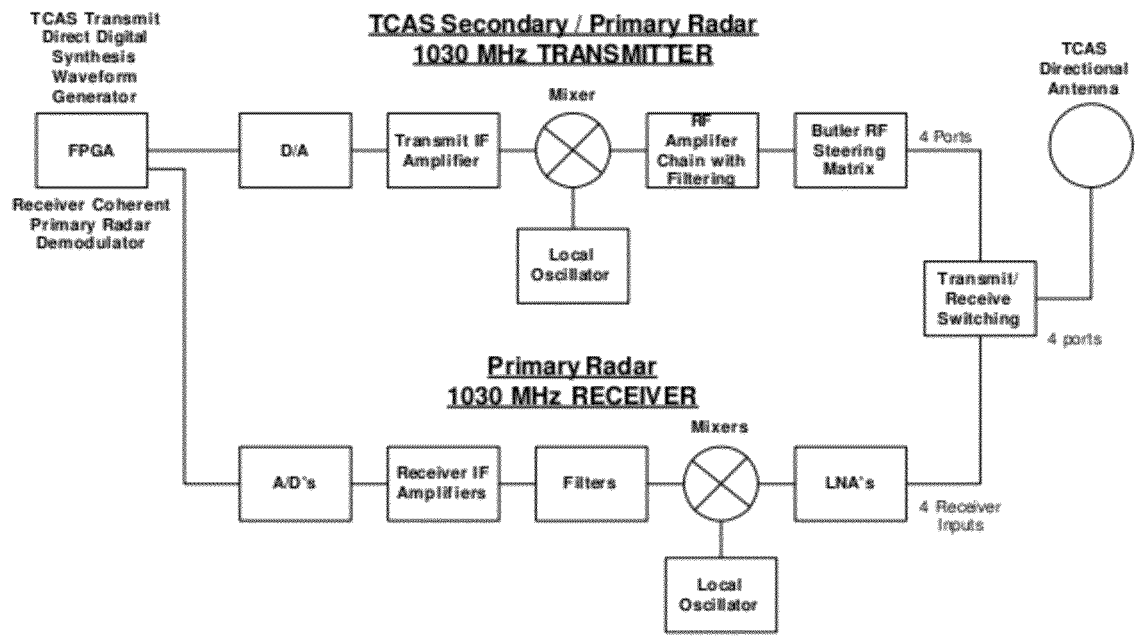
Figure 4, TCAS Primary Radar System Block Diagram

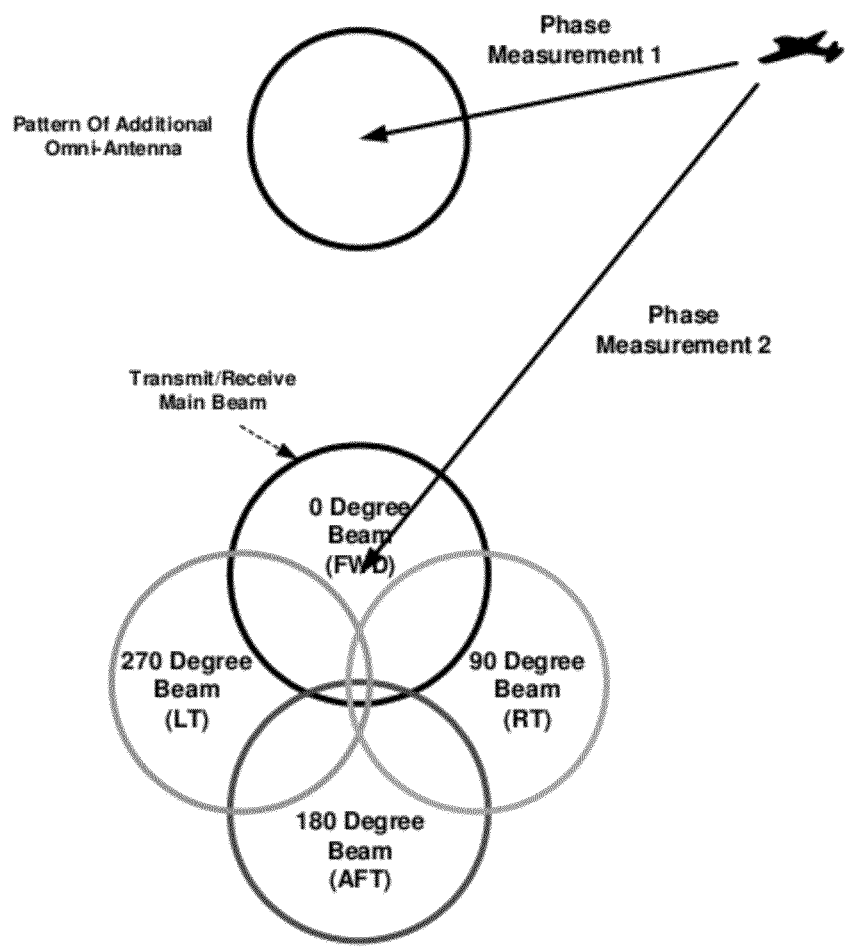
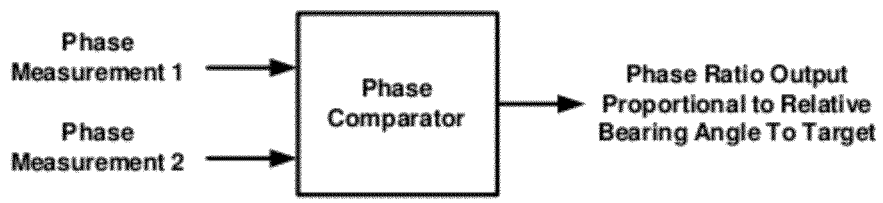
Figure 5, Relative Bearing Measurement Using Additional Antenna

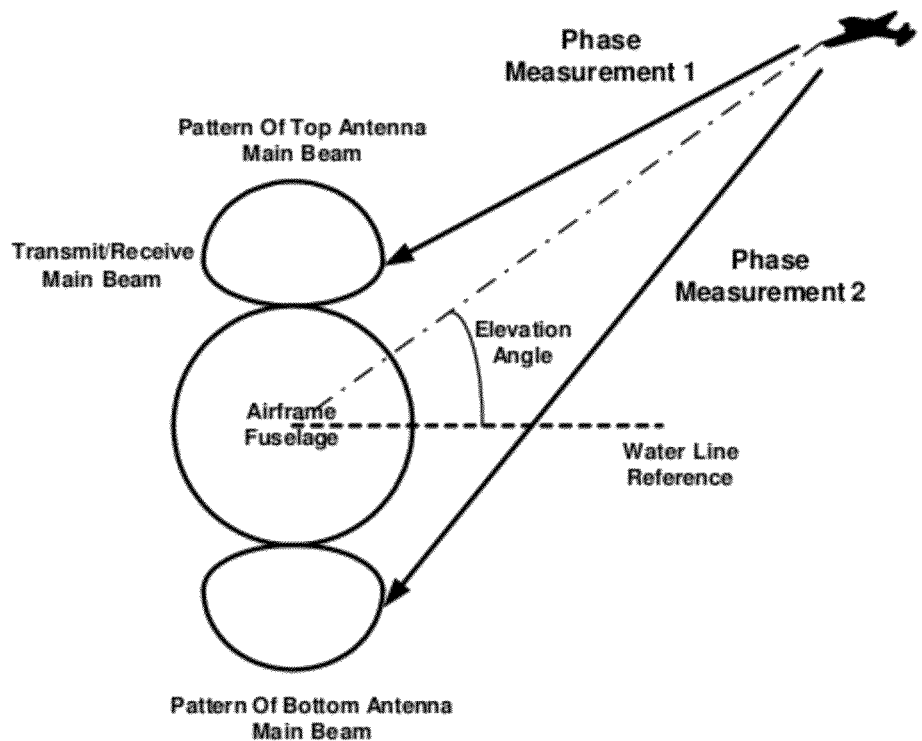
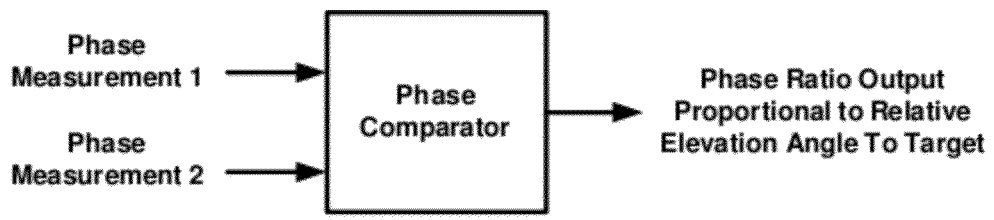
Figure 6, Relative Elevation Angle Measurement Using Top and Bottom TCAS Antennas

SYSTEMS AND METHODS OF PROVIDING A TCAS PRIMARY RADAR

CROSS REFERENCE TO RELATED APPLICATIONS

This application is related to and claims priority from U.S. provisional patent application 61/285,489, entitled TCAS PRIMARY RADAR SYSTEMS AND METHODS and filed on Dec. 10, 2009 in the name of Gregory T. Stayton. This related application is hereby incorporated by reference in its entirety for all purposes.

BACKGROUND OF THE INVENTION

1. Field of the Invention

The present invention relates to radar systems, and more particularly, systems and methods of employing a traffic collision avoidance system (TCAS) to provide a radar function for an unmanned aircraft system (UAS).

2. Description of the Related Art

An unmanned aerial vehicle (UAV) (known also as a remotely piloted vehicle (RPV) or an unmanned aircraft system (UAS)) is an aircraft that is flown by a pilot or a navigator (sometimes referred to as a Combat Systems Officer) without a human crew member on board the aircraft. There is a wide variety of UAV shapes, sizes, configurations and characteristics. Historically, UAVs were simple drones (remotely piloted aircraft), but autonomous control is increasingly being employed by UAVs. Typically, UAVs may be classified as one of two general types: (1) those that are controlled from a remote location and (2) those that fly autonomously based on pre-programmed flight plans using more complex dynamic automation systems.

One of the largest users of UAVs today is the government of the United States, and in particular, the U.S. military. Military UAVs currently perform reconnaissance missions, as well as attack missions. UAVs are also being used in a growing number of non-military or civilian applications, such as firefighting or nonmilitary security work, such as surveillance of pipelines. UAVs may be preferred for missions that are perhaps less well suited for manned aircraft, if, for example, the mission is comparatively dull, dirty, or dangerous.

The abbreviation UAV has been expanded in some cases to UAVS (unmanned-aircraft vehicle system). In the United States, the Federal Aviation Administration (FAA) has adopted the generic classification of unmanned aircraft system (UAS). UAS is also used by International Civil Aviation Organization (ICAO) and other government aviation regulatory organizations.

There is a need for UAS aircraft to be able to fly within the national airspace (NAS) without having to obtain special approval on a case-by-case basis. This requires the UAS aircraft to be able perform surveillance of the airspace and automatically maneuver during flight path conflict between the UAS aircraft and another airborne object or vehicle. Such airborne objects or vehicles can include, but are not limited to another aircraft, a helicopter, a parachutist, a hot air balloon, a glider or any other airborne object or vehicle.

Many aircraft are now equipped with transponders within controlled airspace, and a traffic collision avoidance system (TCAS) can interrogate on 1030 MHz and receive transponder replies on 1090 MHz, as per RTCA document DO-185B (which is incorporated by reference herein in its entirety). This is known in the field as TCAS secondary surveillance. However, there are other objects or vehicles, as described above, that do not possess transponders, i.e., are non-equipped, and cannot therefore provide replies to TCAS interrogations. It is thus desirable that UAS aircraft be able to detect such non-equipped objects or vehicles and avoid them.

Primary tracking radars that provide radio frequency (RF) radar pulse outputs and receive reflections off of non-equipped objects or vehicles exist and are used or proposed for use in UAS aircraft as a means for obtaining range and azimuth tracking information on non-equipped airborne objects or vehicles. This information can then be used in conjunction with other devices, such as electro-optical devices, to develop a range track from the primary tracking radar, an altitude track and a bearing rate track from the electro-optical devices, thereby enabling the UAS aircraft to avoid non-equipped airborne objects or vehicles. Additionally, U.S. Pat. No. 7,414,567 (which is incorporated in its entirety herein by reference) discloses an ADS-B radar that use modified transponder reply transmissions to provide primary tracking of non-equipped airborne objects or vehicles.

Existing methods, such as those set forth above, are disadvantageous in that they require use of a separate primary radar tracking device and an antenna, each of which add considerable weight to a UAS aircraft. Adding such weight to a UAS aircraft limits the payload weight that a UAS aircraft can carry, which may exclude the ability to carry on the UAS aircraft other devices and systems, such as a TCAS which may be needed to fly within the NAS without having to obtain special approval on a case-by-case basis.

U.S. Pat. No. 7,414,567 also requires new modulation to be added to the industry standard waveform for ADS-B 1090 MHz replies, as described in RTCA DO-260B (which is incorporated in its entirety herein by reference). Such new modulation would likely have to be approved for use by the FAA, the Federal Communications Commission (FCC) and other international bodies before the technique could be used, such approval processes typically being lengthy in duration. It would also likely need to be proven that any added modulation applied to the standard ADS-B waveforms does not cause any degradation in the standard decoding function of ADS-B waveforms. Moreover, all equipment fielded to date is not capable of providing the necessary new modulation waveforms to utilize the methods of U.S. Pat. No. 7,414,567. Another difficulty with U.S. Pat. No. 7,414,567 is that the waveform being used for the radar function is 120 microseconds long. The 120 microsecond transmission obscures reflections from other objects and vehicles for 120 microseconds, while the transmission is being sent. This creates a tracking dead zone of approximately 10 nautical miles. Since a range of interest for UAS aircraft to detect non-equipped airborne objects and vehicles may be from 0 to 5 (or 0 to 10) nautical miles from the UAS aircraft, the radar function disclosed by U.S. Pat. No. 7,414,567, having the noted blind spot of 0 to 10 nautical miles, is not viable for use on UAS aircraft.

Thus, a need exists for improved systems and methods for providing a radar function for a UAS aircraft.

SUMMARY OF THE INVENTION

In accordance with an embodiment of the present invention, a system is disclosed for use on a UAS. The system comprises a TCAS having at least a transceiver and an antenna, and a processor coupled to the transceiver for receiving signals generated from receipt of reflected energy received over the antenna, the reflected energy resulting from the one or more of a Mode S interrogation waveform and an ATCRBS interrogation waveform transmitted from the antenna.

In accordance with another embodiment of the present invention, a method is disclosed for providing radar for a UAS. The method comprises providing a TCAS having at least a transceiver and an antenna, transmitting one or more of a Mode S interrogation waveform and an ATCRBS interrogation waveform from the antenna, receiving signals generated from receipt of reflected energy received over the antenna, the reflected energy resulting from the transmitting of the one or more of the Mode S interrogation waveform and the ATCRBS interrogation waveform, providing the received signals to a processor, and determining with the processor one or more spatial aspects of a target from which the energy is reflected.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1 is diagram of exemplary waveforms that may be employed with systems and methods consistent with the present invention.

FIG. 2 is diagram depicting the use of a TCAS for providing a radar function for a UAS, in accordance with systems and methods consistent with the present invention.

FIG. 3 is a diagram of TCAS antenna beam emissions, in accordance with systems and methods consistent with the present invention.

FIG. 4 is a simplified block diagram of a system for providing a TCAS radar function for a UAS, in accordance with systems and methods consistent with the present invention.

FIG. 5 is a diagram depicting the use of a supplemental antenna for providing a TCAS radar function for a UAS, in accordance with systems and methods consistent with the present invention.

FIG. 6 is a diagram depicting the use of the supplemental antenna for providing a TCAS radar function for a UAS, in accordance with systems and methods consistent with the present invention.

DESCRIPTION OF THE EMBODIMENTS

Reference will now be made in detail to the present exemplary embodiments of the invention, examples of which are illustrated in the accompanying drawings.

Embodiments of the present invention primarily disclose systems and methods for using a TCAS RF platform to provide a primary radar function using the already existing industry standard waveforms and modulation required for TCAS secondary surveillance. Such embodiments allow for existing industry standard waveforms and modulations of TCAS, as described in RTCA DO-185B, to be used to provide a primary tracking radar function without the need for any new non-TCAS-industry standard modulation.

Embodiments of the present invention may use the Mode S and ATCRBS interrogation waveforms already being generated and transmitted on 1030 MHz by TCAS for secondary surveillance radar as the emissions to be used for the primary surveillance radar function. Exemplary Mode S interrogation emissions are shown in FIG. 1 and already contains binary 0 to 180 or 180 to 0 degrees of phase transitions at a 4 MHz rate. These emissions include long (112 bit) and short (56 bit) 4 MHz phase transitions and can be used with radar pulse compression techniques to increase the receiver sensitivity when providing a primary radar tracking function. Receiver sensitivity can be increased with these already existing phase transitions by using matched filter techniques by an amount shown in the following equation.

The technique described is familiar to those of skill in the art of radar target tracking, and is one method for achieving pulse compression. Pulse compression allows a longer pulse with relatively lower power levels to be used in place of higher peak power pulse transmissions, thus making it possible to reduce the complexity, size and cost of the radar transmitter. Pulse Compression Gain=B×Tau, where B is the bandwidth of the modulation (4 MHz) and Tau is the length of the pulse in seconds. With reference to FIG. 1, for the long TCAS interrogation pulse area with phase modulation the Tau length is 28 microseconds (112 phase reversals times 0.25 microseconds per reversal), and for the short TCAS interrogation pulse area with phase modulation the Tau length is 14 microseconds (56 phase reversal times 0.25 microseconds per reversal). Taking these two Tau lengths times the modulation bandwidth of 4 MHz provides gains of 112 (20.5 dB) and 56 (17.5 dB) for the long and short pulses, respectively. A sample calculation for the link margin and maximum range of the 28 microsecond pulse is shown below:

- −178 db, loss for a 1 meter$^2$ reflective surface and two hop of 5 miles each way to and from the reflector surface[1], (for a small aircraft), see FIG. 2, TCAS Primary Radar Basic Concept.

[1] See Reference Data For Radio Engineers, Howard W. Sams & Co., inc., 1982 (which is incorporated by reference herein in its entirety).

- +56 dbm, RF peak pulse power at the antenna (400 Watts)
- +20.5 db, processing gain for 28 usec pulse described above
- +2.6 db, TCAS 1030 MHz antenna transmit gain
- +2.6 db, TCAS 1030 MHz antenna receive gain
- −96.3 dbm, Total received signal power For a TCAS system where the LNA receiver input devices are located at the antenna, and where as a result no top/bottom switching is required, eliminating the associated losses with such switching from the front end of the receiver and also where associated coaxial feed losses are eliminated, then about −96 dbm is an optimal level of receiver sensitivity that can be expected. This results in a range of approximately 5 miles for small aircraft using the longest existing TCAS 1030 MHz interrogation pulse of 28 usec.

This range of 5 miles for a tracking radar can be useful for applications requiring detection of aircraft that are not equipped with a transponder (non-cooperative systems), and can therefore not be detected by a standard TCAS system with secondary surveillance that requires transponder replies to function.

The TCAS interrogation pulses being used result in obscured reply reception zones of approximately 28 usec/12 usec per nmi. (0 to 2.3 nmi.) and 14 usec/12 usec per nmi. (0 to 1.16 nmi.). Since more receiver processing gain is required for greater distance from the transmitting TCAS UAS radar system, embodiments of the present invention may use the longer 28 usec pulse for ranges from 2.3 nmi. to 5.0 nmi. and the shorter 14 usec pulse for ranges from 1.16 to 2.3 nmi.

If primary radar range tracks of non-equipped objects and vehicles of less than 1.16 nmi. is desired, then standard ATCRBS interrogation waveforms can be used, as shown in FIG. 1. The P1 pulse of this waveform can be used to create received primary radar reflections from 0 to 1.16 nmi. without the use of phase modulation since the distance is significantly shorter. Also the P3 and P4 pulses can be used, if needed, for an additional processing gain of 3 db since two pulses provide twice the gain as one pulse when using a receiver matched filter. Similarly, all three pulses could be used with a matched filter for a gain of 4.8 db.

Additional gain can be achieved by using more than one ATCRBS interrogation concatenated together and sent to the matched filter since standard TCAS emissions include more than 1 ATCRBS interrogation per second when at least one other transponder equipped aircraft is in range.

TCAS secondary Mode S surveillance interrogations include a short 14 usec pulse, and contain differing data patterns for each aircraft Mode S transponder that is interrogated. This is because the DO-185B requirements for interrogation data structures use an overlaid parity on top of the unique Mode S address 24 bits in the interrogation data for each aircraft. The overlaid parity results in a somewhat random data pattern when transmitted prior to being decoded back into the Mode S address. Random data patterns may provide a more accurate measurement of range due to a more averaged range measurement result[2]. This is known as the amount of "ambiguity" in the range measurement.

[2] See Pulse Compression for Weather Radars, NCAR/TN-434, Ashok S. Mudukutore, et. al., August 1996 (which is incorporated by reference herein in its entirety).

TCAS broadcast and resolution coordination transmissions may be sent as well, and these may include the long 28 usec pulse that can be used for the desired maximum range tracking.

Referring to FIG. 3, standard TCAS secondary emissions and thus the secondary emissions used as primary emissions from a TCAS are typically sent out for each quadrant since TCAS uses an antenna with four 90 degree beams at least for the top antenna. Some TCAS systems have an omni-directional bottom antenna, but all systems have the option for installation of a bottom directional antenna that can also be used for primary radar functionality. Those of skill in the art will understand that an antenna beam pattern can be created by phasing the RF inputs into a set of antenna elements.

Ground clutter elimination is also part of a primary radar system and is obtainable when using coherent transmitted modulation with coherent received demodulation, i.e. stable transmitter and receiver frequency references. A moving target will have a Doppler shift in frequency due to its motion. The motion of the primary radar system in its vehicle can be taken into account by subtracting its velocity from the received frequency drift which leaves the Doppler frequency shift (perceived as a phase drift) due to the moving target. For the case where a ground object such as a building is providing a reflection the net Doppler frequency shift of the building after subtracting out the velocity of the primary radar vehicle is zero, and can then be filtered out from the output of the primary radar system. A very stable frequency reference is already required for TCAS transmissions where the initial frequency tolerance of 1030 MHz is specified to be +/−10 KHz for the life of the equipment. Additional methods of ground clutter elimination can be provided such as excluding strong return signals that exceed a reasonable threshold and by the use of range gating. Range gates can be created for return signals that have reasonable amplitudes versus range to filter out ground returns.

Range gates may be maintained in memory storage in a digital system so that the radar returns that occur within each of the widths of the range gate time windows are accepted as valid returns for airborne vehicles removing other non-airborne targets from the data to be processed. Range rate can be used to move the range gate window in the direction of the vehicle range velocity so as to keep the range gate centered in time around the point of an expected radar range return.

Information, such as altitude of own aircraft, can also be used to determine ranges expected for ground reflection returns and can also be combined with information, such as described above (phase drift, amplitude signal strength), to filter out ground clutter.

FIG. 4 depicts a simplified block diagram of an exemplary primary radar system according to aspects of the present invention. The FPGA in this example may be used to provide direct digital synthesis (DDS) of the TCAS interrogation 1030 MHz waveform with required TCAS phase modulation for secondary surveillance that may also be used for primary radar surveillance. The signal may be converted from a digital sample sequence by the Digital to Analog (D/A) converter to an Intermediate Frequency (IF) and may then be up-converted to the final RF frequency by a stable frequency local oscillator and mixer. The signal may then be filtered and amplified and provided to a butler matrix to steer the transmitted signal into the correct antenna port (quadrant).

The received 1030 MHz reflection back from the target may be switched into the receivers by the Transmit/Receive switches. Each port of the antenna may be connected to a separate receiver for a total of 4 receivers. Each receiver then may have a Low Noise Amplifier (LNA) whose signal may be down-converted by the stable local oscillator and mixer and then filtered and amplified at the IF frequency. This signal may then be sampled by an A/D above the Nyquist rate and provided to the FPGA for received signal demodulation and processing of the phase information into a matched filter inside the FPGA. The output target range measurement provided by the matched filter and ground clutter interference elimination algorithms may then be provided to a computer for processing into a target track with an associated range gate, as described above.

Bearing measurements for TCAS secondary surveillance may use the two side beams adjacent to the transmit/receive main beam to provide a ratio between the two strongest beam signals, i.e., the main beam and one of the adjacent side beams to determine the relative bearing to a target. Since the receive power levels for the main beam used as a primary radar may be at or near the sensitivity threshold of the receiver, this method of determining relative bearing may not work well for targets at or near maximum range.

To solve this problem, the present invention may include an omni antenna ¼ wavelength vertical antenna element in front and/or in back of the TCAS 4-element directional antenna, as represented in FIG. 5. This antenna element can be used to receive the phase of an incoming primary radar reflected signal and compare it to the phase received by the TCAS directional main beam. These phases from the main beam and from the omni directional antenna element can be used to determine a phase ratio which provides a measurement of the relative bearing to the target. Additionally, when transmitting and receiving, the added element can act as an additional antenna director passive element providing some additional antenna gain in the direction of the additional element from the TCAS directional antenna.

Bearing ambiguity relative to the centerline of the main beam can be resolved either by natural or intentional yaw rate motion correlated with bearing direction changes, i.e. yaw rate to the right causes an apparent bearing rate to the left so that if the measured bearing is on the wrong side of the main beam, the correlation is opposite to that described. Another method to remove bearing ambiguity is to form the two adjacent beams (by phase adjustment of the antenna elements) so that they overlap such that the secondary crossover notch (the notch of the two overlapping adjacent beams near the center of the main beam, see FIG. 3, TCAS antenna beam emissions) is only a few db lower in sensitivity relative to the main beam. Thus, a coarse bearing measurement can be made to eliminate bearing ambiguity. FIG. 3 may be used here as a reference since transmit beam patterns are a duplicate of the received beam patterns because the transmitted radar signal is on the same frequency as the received radar reflected signal from the target.

Referring to FIG. 6, elevation measurements for the primary radar system can be done by use of the TCAS bottom omni or directional antenna. The phase path between the top and bottom antenna can be calibrated to zero by a phase shifter function within the FPGA shown in FIG. 4. Distance between the top and bottom antenna may be constrained based on the phase difference versus an altitude displacement at a particular minimum range. A measurement of 1000 ft. above and below the aircraft at a range of 1 nmi. can be measured with a distance of up to 3 ft. between the top and bottom antenna without exceeding a one wavelength path difference phase between the two antennas.

Once calibrated, the phase difference between the top and bottom TCAS antennas can be used similarly to that described above for bearing measurements, except in this case the phase ratio is a measure of the elevation angle to the target. This elevation angle combined with the range to the target and the pitch angle of the aircraft relative to its "waterline" (level relative to the earth) can be used geometrically to determine the target's relative altitude. This altitude can be used to correlate with TCAS secondary surveillance altitude or ADS-B received altitude data to improve the integrity of the altitude information as well as used for a measure of vertical closest point of approach (CPA) for non-cooperative (non-transponder equipped) aircraft to reduce nuisance alerts. This type of derived altitude measurement can be used by an associated non-cooperative collision avoidance system that might be in an unmanned aircraft.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   a TCAS having at least a transceiver and an antenna; and
   processor coupled to said transceiver for receiving signals generated from receipt of reflected energy received over the antenna, the reflected energy resulting from the one or more of a Mode S interrogation waveform and an ATCRBS interrogation waveform transmitted from the antenna; and
   wherein said system resides on and is for use on a UAS.

2. The system of claim 1, wherein the processor is further configured to determine one or more spatial aspects of a target from which the energy is reflected based on the signals.

3. A method comprising:
   providing a TCAS having at least a transceiver and an antenna;
   transmitting one or more of a Mode S interrogation waveform and an ATCRBS interrogation waveform from the antenna;
   receiving signals generated from receipt of reflected energy received over the antenna, the reflected energy resulting from the transmitting of the one or more of the Mode S interrogation waveform and the ATCRBS interrogation waveform;
   providing the received signals to a processor; and
   determining with the processor one or more spatial aspects of a target from which the energy is reflected; and
   wherein a system performing said method resides on and is for use on a UAS.

* * * * *